United States Patent [19]

Cheresnowsky et al.

[11] Patent Number: 4,702,895
[45] Date of Patent: Oct. 27, 1987

[54] PURIFICATION OF MOLYBDENUM

[75] Inventors: Michael J. Cheresnowsky, Towanda; Timothy A. Brunelli, Wyalusing; Tai K. Kim, Towanda, all of Pa.

[73] Assignee: GTE Products Corporation, Stamford, Conn.

[21] Appl. No.: 859,290

[22] Filed: May 2, 1986

[51] Int. Cl.$^4$ .............................................. C01G 39/00
[52] U.S. Cl. ........................................ 423/54; 423/55; 423/56; 423/58
[58] Field of Search .......................... 423/54, 55, 56, 58

[56] References Cited

U.S. PATENT DOCUMENTS

| | | | |
|---|---|---|---|
| 3,829,550 | 8/1974 | Ronzio et al. | 423/55 |
| 4,273,745 | 6/1981 | Laferty et al. | 423/55 |
| 4,320,094 | 3/1982 | Menashi et al. | 423/55 |
| 4,555,386 | 11/1985 | Cheresnowsky | 423/54 |

Primary Examiner—H. T. Carter
Attorney, Agent, or Firm—Donald R. Castle; L. Rita Quatrini

[57] ABSTRACT

A method is disclosed for purifying molybdenum which involves adding to an ammoniacal ammonium molybdate solution containing the impurities of phosphorus and arsenic with the phosphorus concentration being from about 0.01 to about 0.12 g/l, a soluble magnesium salt to form a precipitate comprising magnesium ammonium salts of the phosphorus and arsenic, and to form a purified ammonium molybdate solution. The amount of the magnesium salt is sufficient to result in a concentration of from about 0.005 to about 0.04 moles/l in the ammoniacal ammonium molybdate solution. The resulting purified ammonium molybdate contains no greater than about 0.01 g P/l. The precipitate is separated from the purified solution which is then contacted with a chelating cation exchange resin supplying a sufficient amount of a cation to result in removal of the major portion of the magnesium ions from the purified solution and form a further purified ammonium molybdate solution.

10 Claims, 1 Drawing Figure

Phosphorus and Arsenic Precipitation as a Function of Magnesium Concentration

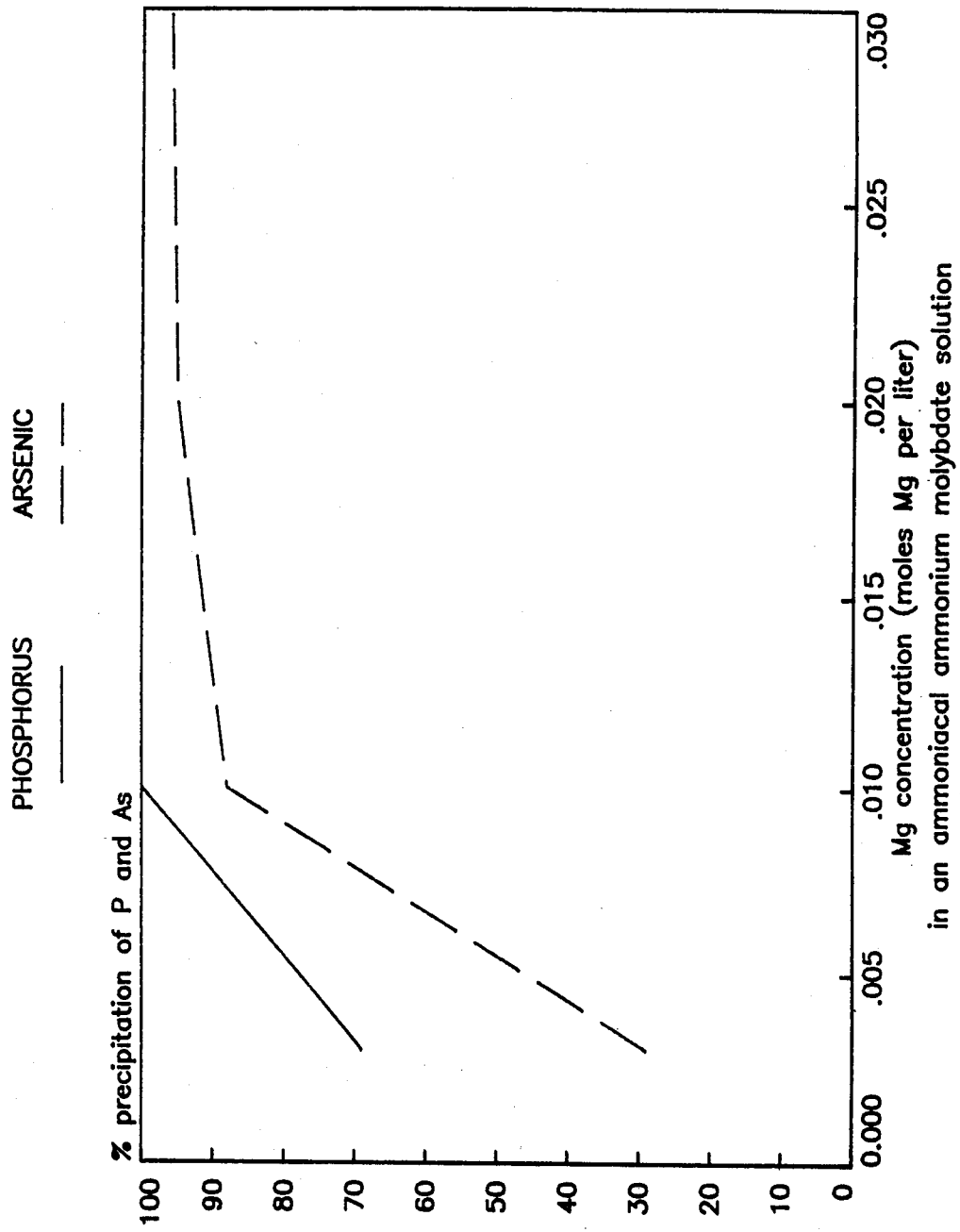

PURIFICATION OF MOLYBDENUM

BACKGROUND OF THE INVENTION

This invention relates to a method for purifying molybdenum which involves precipitating magnesium-ammonium salts of arsenic and phosphorus from an ammoniacal ammonium molybdate solution followed by removal of the magnesium from the solution.

Sources of molybdenum such as impure or technical grade molybdenum trioxide are often contaminated with phosphorus and/or arsenic. These impurities are difficult to remove and are often present as contaminants in molybdenum compounds where they result in inferior quality of the molybdenum products. For example, phosphorus in ammonium dimolybdate shows up in the subsequently produced molybdenum metal. Phosphorus at a level of about 40 ppm in molybdenum powder causes a decrease in the rolling efficiency of molybdenum.

Therefore, a method to remove impurities such as phosphorus and arsenic from molybdenum would be advantageous because it would allow processing of a wide variety of molybdenum sources.

U.S. Pat. No. 3,829,550 discloses a process for producing a high purity molybdenum trioxide and/or ammonium molybdate product whereby an oxidized molybdenite concentrate is subjected to an ammonium hydroxide leaching step including a digestion phase in which an oxidation of some of the impurities therein, particularly iron, is effected, resulting in a coprecipitation of iron and aluminum hydroxide, together with other impurities including lead, bismuth, tin, arsenic, phosphorus, soluble silica, and the like. The resultant aqueous solution containing ammonium molybdate is filtered and thereafter crystallized, followed by calcining to produce a high purity molybdenum trioxide. This molybdenum trioxide can be further purified by digestion in a dilute nitric acid solution to effect a further leaching of residual contaminants, and thereafter the molybdenum trioxide is redissolved in an aqueous ammonium hydroxide solution which is filtered and subsequently crystallized to produce a high purity ammonium molybdate.

SUMMARY OF THE INVENTION

In accordance with one aspect of this invention, there is provided a method for purifying molybdenum which involves adding to an ammoniacal ammonium molybdate solution containing the impurities of phosphorus and arsenic with the phosphorus concentration being from about 0.01 to about 0.12 g/l, a soluble magnesium salt to form a precipitate comprising magnesium ammonium salts of the phosphorus and arsenic, and to form a purified ammonium molybdate solution. The amount of the magnesium salt is sufficient to result in a concentration of from about 0.005 to about 0.04 moles /l in the ammoniacal ammonium molybdate solution. The resulting purified ammonium molybdate contains no greater than about 0.01 g P/l. The precipitate is separated from the purified solution which is then contacted with a chelating cation exchange resin supplying a sufficient amount of a cation to result in removal of the major portion of the magnesium ions from the purified solution and form a further purified ammonium molybdate solution.

BRIEF DESCRIPTION OF THE FIGURE

FIG. 1 is a plot of magnesium concentration as moles per liter versus percent phosphorus and percent arsenic removed by precipitation of their respective magnesium-ammonium salts from a solution containing initially about 0.06 g P/l, and about 0.06 g As/l.

DETAILED DESCRIPTION OF THE INVENTION

For a better understanding of the present invention, together with other and further objects, advantages and capabilities thereof, reference is made to the following disclosure and appended claims in connection with the above described drawing and description of some of the aspects of the invention.

This invention relates to a method for removing phosphorus and arsenic from an ammoniacal ammonium molybdate solution by adding to the solution a soluble magnesium salt to result in the resulting solution having a magnesium content of from about 0.005 to about 0.04 moles/l to precipitate the magnesium ammonium salts of phosphorus and arsenic and thereafter removing the magnesium ions from the purified ammonium molybdate solution by contacting the solution with a chelating cation exchange resin. The removal of magnesium ions from the purified ammonium molybdate solution allows the process to be commercially feasible.

U.S. Pat. No. 4,273,745 discloses a process for recovering molybdenum trioxide from ammonium molybdate solutions containing $U_3O_8$ by first precipitating phosphorus and then acidifying and precipitating ammonium polymolybdate which is converted to molybdenum trioxide. This patent does not teach the criticality of the concentration of the water soluble phosphours precipitataing compound in ammoniacal ammonium molybdate, in particular of a magnesium water soluble salt, nor does it teach or suggest a critical pH range to precipitate magnesium ammonium phosphate, whereas these are essential features of the present invention. Also this patent does not provide for the removal of magnesium ions from the solution after precipitation of the phosphorus which is another feature of this invention.

U.S. Pat. No. 4,278,644 discloses recovery of refractory and base metals from superalloy scrap. It provides detailed methods for recovery of Mo, W, Cr, and V. While phosphate removal is discussed, it does not claim a phosphorus removal step. The molybdenum containing solutions of U.S. Pat. No. 4,278,644 are basically different from those of the present invention. For example, in U.S. Pat. No. 4,278,644 the solution is an alkali metal solution containing molybdenum, tungsten, vanadium, chromium, carbonate, and about 2.5 g P/l typically. In the present invention, the solution is an ammoniacal ammonium molybdate solution and any W, V, or Cr is present in trace quantities, and the P concentration of typically from about 0.01 to about 0.12 g/l. In U.S. Pat. No. 4,278,644, the acceptable level of P in the phosphorus purified solution is about 0.02 g/l whereas in the present invention, P in the purified solution is no greater than about 0.01 g/l. U.S. Pat. No. 4,278,644 does not provide for a magnesium removal step as in the present application.

U.S. Pat. No. 4,320,094 also discloses a process for recovery of refractory and base metals from superalloy scrap. This process is different from the present invention for essentially the same reasons discussed above for U.S. Pat. No. 4,278,644.

The molybdenum to be purified is typically an impure molybdenum trioxide or a technical grade molybdenum trioxide.

The molybdenum trioxide is dissolved in sufficient ammonium hydroxide so that the pH of the resulting ammoniacal ammonium molybdate solution is from about 8.5 to about 11 and preferably from about 9 to about 10. The pH ranges are necessary for the susequent precipitation of the magnesium-ammonium salts of arsenic and phosphorus. The solution contains typically from about 180 to about 240 g Mo/l, and from about 0.01 to about 0.12 g P/l. The arsenic content can vary, but is typically greater than about 0.01g/l and most typically in the range of from about 0.01 g/l to about 0.06 g/l. The solution can also contain 0.02 g W/l, trace amounts of Ca and Cu, and other impurities. A soluble magnesium salt is added to the ammoniacal ammonium molybdate solution to form a precipitate comprising magnesium-ammonium salts containing a portion of the phosphorus and/or arsenic and a purified ammonium molybdate solution containing magnesium ions. The typical magnesium salts are magnesium chloride, magneisum nitrate, and magnesium sulfate. Magnesium nitrate is especially preferred.

It is critical that the amount of magnesium be sufficient to result in a concentration in the ammoniacal ammonium molybdate solution of from about 0.005 to about 0.04 moles Mg/l, and preferably from about 0.008 to about 0.04 moles Mg/l. When the Mg content of the ammoniacal ammonium molybdate solution is least 0.005 moles/l, the P content of the resulting purified solution is no greater than about 0.01 g/l. When the magnesium content is at least about 0.008 moles/l, the P content of the resulting purified solution is no greater than about 0.005 g/l, and the As content is no greater than about 0.01 g/l.

The precipitate is then separated from the resulting partially purified ammoniacal ammonium molybdate solution by any standard technique such as filtration. Along with this precipitate can be residual solids which may be present from the original dissolution of the molybdenum trioxide in the ammonium hydroxide.

This purified ammonium molybdate solution contains magnesium ions from the magnesium salt. These ions are removed to further purify the molybdenum as follows.

The solution is contacted with a chelating cation exchange resin supplying a sufficient amount of a cation to remove the major portion of the magnesium ions and form a further purified ammonium molybdate solution.

The chelating cation exchange resin is an iminodiacetate resin. The preferred chelating cation exchange resin is supplied by Mobay under the trade name of Lewatit TP-207. Other resins such as Rohm and Haas IRC-718 and Biorad Chelex 100 can also be used. The cation is typically the ammonium ion which is exchanged for the magnesium ions of the solution.

The actual cation exchange operation is done by standard techniques preferably by passing the solution containing the magnesium ions through a column which is packed with the resin having as the cation the ammonium ion. In actual practice, by analyzing the effluent from the column for magnesium, it is determined when the column is loaded.

The resulting spent resin which now contains magnesium cations can be regenerated by washing with acid to remove any metal ions, followed by washing with ammonium hydroxide to restore the ammonium ion as the cation.

The resulting further purified ammonium molybdate solution can now be processed by standard methods such as by evaporative crystallization to obtain ammonium dimolybdate which can then be reduced to molybdenum metal.

The above described method is a way to purify molybdenum of the hard to remove common contaminants of phosphorus and arsenic.

In the molybdenum metal, phosphorus levels above about 40 weight parts per million based on Mo content, reduce the rolling efficiency of the molybdenum. By the method of the present invention, treating a solution containing from about 180 to about 240 g Mo/l with a magnesium salt at a concentration of about 0.01 moles Mg/l, typically results in a P content in solution of no greater than about 0.006 g/l. The Mo metal produced from this type of solution typically contains about 25 weight ppm P on a Mo basis. This is a sufficiently low P content so that problems in processing the Mo metal due to P contamination do not occur.

To more fully illustrate this invention, the following nonlimiting examples are presented.

EXAMPLE 1

To about 100 ml of an ammoniacal ammonium molybdate solution containing about 180 g Mo/l and about 0.076 g P/l is added about 1 ml of a 1.0 molar $MgCl_2.6H_2O$ solution which supplies about 0.01 moles of Mg/l. A precipitate forms and is removed by filtration. The resulting purified solution contains < about 0.005 g P/l. The molybdenum concentration remains at about 180 g/l. When the molybdenum is processed to molybdenum metal, the P content is about 28 weight ppm based on Mo.

EXAMPLE 2

About 1150 gallons of ammonium molybdate solution at a pH of about 8.8 contains about 240 g Mo/l, about 0.077 g P/l, and about 0.050 g As/l. When about 3 gallons of about 1.1 M $MgCl_2.6H_2O$ is added to result in a concentration of about 0.003 moles of Mg/l in the ammonium molybdate solution at about 28° C., a precipitate does not form. Ammonium hydroxide is added to increase the pH to about 9.8 and about 3 more gallons of 1.1 M $MgCl_2.6H_2O$ are added to result in a magnesium concentration of about 0.006 moles per liter. A precipitate forms and is removed by filtration. The phosphorus content of the resulting purified solution is about 0.01 g/l.

EXAMPLE 3

An ammoniacal ammonium molybdate solution contains about 200 g Mo/l, about 0.064 g P/l, and about 0.063 g As/l. About 6 gallons of about 1.1 M $MgCl_2.6H_2O$ is added to about 2000 gallons of the molybdate solution at about 24° C. to result in the solution having a magnesium concentration of about 0.003 moles per liter. A precipitate forms and is removed by filtration. The phosphorus content of the resulting partially purified ammonium molybdate solution is about 0.020 g/l, and the arsenic content is about 0.045 g/l. The precipitation removes about 69% of the phosphorus and about 29% of the arsenic. The resulting partially purified solution is passed through Lewatit-TP-207 chelating cation exchange resin in the ammonium form. The resulting purified molybdate solution is essentially free of magnesium after the ion exchange.

EXAMPLE 4

The molybdate solution of Example 3 is used in this example. Magnesium is added as 1.0 M $Mg(NO_3)_2 \cdot 6H_2O$ in varying amounts: 2 ml, 4 ml, and 6 ml of the magnesium solution are added to 3-200 ml portions of molybdate solution. The magnesium additions provide 0.01, 0.02, and 0.03 moles Mg/l respectively. Precipitates formed in each case which are filtered from the respective solutions. The resulting solutions are analyzed for phosphorus and arsenic. Each Mg additive equal to or above about 0.01 moles/l lowers the P content to less than about 0.005 g/l and the As content to less than about 0.01 g/l.

The results of Examples 3 and 4 are included in FIG. 1 and in Table 1 that follows. FIG. 1 shows how the percent P and As removed increase with increasing Mg concentration.

TABLE 1

Precipitation of Phosphorus and Arsenic
Given: Ammoniacal ammonium molybdate solution containing about 200 g Mo/l, about 0.064 g P/l and about 0.063 g As/l.

| | Example 3 | | Example 4 | |
|---|---|---|---|---|
| Moles Mg/l Added | 0.003 | 0.01 | 0.02 | 0.03 |
| impurity level after precipitation: | | | | |
| g/ P/l | 0.020 | <0.005 | <0.005 | <0.005 |
| g As/l | 0.045 | 0.007 | 0.003 | <0.003 |
| % P removed | 69 | 100 | 100 | 100 |
| % As removed | 29 | 88 | 95 | >95 |

EXAMPLE 5

An ammonacal ammonium molybdate solution contains about 200 g Mo/l, about 0.105 g P/l, and about 0.04 g As/l. The pH is about 9.3 at about 22° C. Mg ion is added as an aqueous solution of $MgCl_2 \cdot 6H_2O$. Additions are made so that concentrations range from about 0.001 moles Mg/l to about 0.04 moles Mg/l. The solutions are stirred for about 1 hour and then allowed to stand for about 3 hours. The resulting precipitates are filtered from each solution. The solutions are then analyzed for As concentration. To determine effectiveness of removal of P, the solutions are evaporated to dryness to form ammonium dimolybdate, ADM, which is then reduced to molybdenum metal. The phosphorus content of the resulting Mo metal is measured and is reported in Table 2.

TABLE 2

P and As Precipitation as a Function of Mg Concentration

| Sample # | Moles Mg/l Added | In Purified Solution g As/l | In Mo Powder weight ppm P |
|---|---|---|---|
| Control | None | 0.04 | 530 |
| 1 | 0.001 | 0.04 | 320 |
| 2 | 0.003 | 0.03 | 120 |
| 3 | 0.005 | 0.02 | 45 |
| 4 | 0.008 | 0.01 | 25 |
| 5 | 0.01 | 0.01 | 22 |
| 6 | 0.02 | 0.01 | 22 |
| 7 | 0.03 | 0.01 | 23 |
| 8 | 0.04 | 0.001 | 20 |

It can be seen that increasing the Mg content to about 0.008 moles/l, results in about 25 weight ppm in the Mo metal. This is an acceptable P level. Increasing the amount of magnesium results in an increased removal of both P and As.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for purifying molybdenum comprising:
   (a) adding to an ammoniacal ammonium molybdate solution which is at a pH of from about 8.5 to about 11 and which contains the impurities of phosphorus and arsenic with the phosphorus concentration being from about 0.01 to about 0.12 g/l, a soluble magnesium salt to form a precipitate comprising magnesium ammonium salts of said phosphorus and said arsenic, and to form a purified ammonium molybdate solution, with the amount of said magnesium salt being added in an amount sufficient to result in a concentration of from about 0.005 to about 0.04 moles Mg/l in said ammoniacal ammonium molybdate solution, and said purified solution containing no greater than about 0.01 g P/l;
   (b) separating said precipitate from said purified ammonium molybdate solution; and
   (c) contacting said purified ammonium molybdate solution with a chelating cation exchange resin supplying a sufficient amount of ammonium as the cation to remove the major portion of the magnesium ions from said purified solution and form a further purified ammonium molybdate solution.

2. A method of claim 1 wherein the As content of said ammoniacal ammonium molybdate solution is greater than about 0.01 g/l.

3. A method of claim 2 wherein said As content is from about 0.01 to about 0.06 g/l.

4. A method of claim 1 wherein the pH is from about 9 to about 10.

5. A method of claim 1 wherein said magnesium salt is selected from the group consisting of magnesium chloride, magnesium nitrate, and magnesium sulfate.

6. A method of claim 5 wherein said magnesium salt is magnesium nitrate.

7. A method of claim 1 wherein said magnesium salt is added to said ammonaical ammonium molybdate solution in an amount sufficient to result in a magnesium content of said solution of from about 0.008 to about 0.04 moles Mg/l.

8. A method of claim 7 wherein the As content of said purified ammonium molybdate solution is no greater than about 0.01 g/l.

9. A method of claim 7 wherein the P content of said purified ammonium molybdate solution is no greater than about 0.006 g/l.

10. A method of claim 1 wherein said chelating cation exchange resin is an iminodiacetate resin.

* * * * *